United States Patent [19]

Dollhausen et al.

[11] 3,935,134

[45] Jan. 27, 1976

[54] HEAT-SEALING ADHESIVES

[75] Inventors: Manfred Dollhausen, Odenthal; Gerhard Hohmann, Leverkusen, both of Germany

[73] Assignee: Bayer Aktiengesellschaft, Germany

[22] Filed: Apr. 19, 1974

[21] Appl. No.: 462,308

[30] Foreign Application Priority Data

Apr. 25, 1973 Germany............................ 2320805

[52] U.S. Cl.............. 260/3.5; 156/333; 260/31.2 R; 260/31.2 MR; 260/32.8 A; 260/33.4 PQ; 260/33.6 A; 260/33.6 PQ; 260/33.8 UA; 260/845; 260/847; 260/889; 260/890; 260/897 C; 428/463

[51] Int. Cl.².................... C08L 15/02; C08L 7/00

[58] Field of Search ....... 260/3.5, 889, 890, 33.6 A, 260/33.6 PQ, 897 C; 156/333

[56] References Cited

UNITED STATES PATENTS

| | | | |
|---|---|---|---|
| 2,490,536 | 12/1949 | Murphy et al. | 260/3.5 |
| 2,776,914 | 1/1957 | Faulwetter | 260/3.5 |
| 3,053,712 | 11/1962 | Grabowski | 156/333 |
| 3,258,389 | 6/1966 | Coleman et al. | 156/333 |
| 3,351,677 | 11/1967 | Barton et al. | 260/889 |

*Primary Examiner*—John C. Bleutge
*Attorney, Agent, or Firm*—Connolly and Hutz

[57] ABSTRACT

An adhesive consisting substantially of a modified olefine polymer, a chlorinated olefine or diene polymer, an alkylated polyphenyl, an aromatic polynitroso compound and an organic solvent or solvent mixture.

6 Claims, No Drawings

HEAT-SEALING ADHESIVES

This invention relates generally to adhesives, and in particular to heat-resistant heat-sealing adhesives obtained from a modified olefine polymer, a chlorinated olefine or diene polymer, an aromatic polynitroso compound, an alkylated polyphenyl and an organic solvent.

It is known that adhesives which contain solvents can be prepared from ethylene/vinyl ester copolymers. U.S. Patent No. 2,543,229 describes the use of ethylene/vinyl acetate copolymers for producing solvent-containing adhesives for glueing polyethylene to textiles and paper, and also to less flexible materials such as metal, wood or stone. According to German Patent Specification No. 1,071,953, solvent-containing adhesives prepared from ethylene/vinyl acetate copolymers can also be used for bonding glass to safety glass. German Auslegsschrift No. 1,295,123 describes the use of solvent-containing adhesives for glueing together wood and polyurethane foams.

One serious disadvantage of bonds produced with these conventional adhesives is their low strength, which especially at elevated temperatures is often quite insufficient for practical purposes, as for example in the case of metal-to-rubber or metal-to-plastics bonds used in the motor vehicle industry.

It is an object of this invention to provide solvent-containing adhesives which give rise to heat-resistant bonds having excellent strength and a high resistance to organic solvents, oils, fats and other external influences.

The problem was solved by preparing adhesives from a modified olefine polymer, a chlorinated olefine or diene polymer, an alkylated polyphenyl, an aromatic polynitroso compound and an organic solvent or solvent mixture.

This invention therefore provides an adhesive which consists basically of (a) modified olefine polymer, (b) a chlorinated olefine or diene polymer, (c) an alkylated polyphenyl, (d) an aromatic polynitroso compound and (e) an organic solvent or solvent mixture.

The modified olefine polymer (a) used for preparing the adhesives according to the invention may be, for example, an ethylene/vinyl ester copolymer of the kind which can be obtained by known methods of polymerisation from ethylene and vinyl esters of organic acids which contain from 2 to 10 carbon atoms. The following are examples of vinyl esters which may be used for this purpose: vinyl esters of acetic acid, propionic acid, butyric acid, caproic acid, caprylic acid and capric acid. Vinyl acetate is preferred. Particularly advantageous results are obtained when using ethylene/vinyl acetate copolymers of the kind described in German Offenlegungsschrift No. 1,495,660 = U.S. Pat. No. 2,947,735, particularly polymers which have a vinyl acetate content of from 35 to 70 % by weight preferably 40 – 50 % by weight, and among these again preferably those which have a melt index, determined according to ASTM d 1238, condition E, of from 1 – 100, preferably from 2-15.

The modified olefine polymers used for producing the adhesives according to the invention may also be a chlorosulphonation product of polyisobutylene which can be obtained by conventional processes, and especially the chlorosulphonation products of polyethylene. The chlorosulphonated olefines have chlorine contents of from 20 to 60 % by weight, preferably from 25 to 50 % by weight, and a sulphur content of from 0.2 to 2.0 % by weight, preferably from 0.5 to 1.5 % by weight.

The modified olefine polymers used are preferably ethylene/vinyl acetate copolymers.

The chlorinated olefine polymers or diene polymers (b) used may be chlorination products of polyethylene or polypropylene which have been prepared by conventional methods, especially the chlorination products of natural rubber and, in particular, of polyisoprene. The aforesaid chlorination products have chlorine contents of from 60 to 70 % by weight and 20 % solutions of the products in toluene have a viscosity of about 40 – 250 Poises, determined at 20°C with a Brookfield LVF viscosimeter (Spindel 1, 30 revs. per min.). The chlorinated polymer preferably used is chlorinated polyisoprene.

Alkylated polyphenyls (c) used according to the invention are represented by the following general formula:

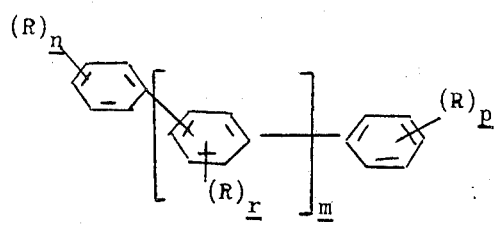

in which R denotes an alkyl-, with 1 to 10 carbon atoms, alkoxy-, with 1 to 10 carbon atoms, cycloalkyl-, with 5 to 12 carbon atoms, phenyl-, phenylalkyl-, with 7 to 13 carbon atoms, alkylphenyl-, with 7 to 13 carbon atoms, phenoxy- or phenyl alkoxy group with 6 to 12 carbon atoms, $n$ denotes 0 or an integer of from 1 to 5, $p$ denotes 0 or an integer of from 1 to 5, $r$ denotes 0 or an integer of from 1 to 4; and $m$ denotes 0 or an integer of from 1 to 3.

In the above general formula, R preferably denotes an alkyl group which contains 2 – 4 carbon atoms, in particular isopropyl, or a phenyl alkyl or an alkyl phenyl group containing 2 – 4 carbon atoms in the alkyl group, in particular phenyl ethyl, and $n$ preferably denotes a number of from 0 – 2, $p$ denotes 1 or 2, $r$ denotes a number of from 0 – 2 and $m$ denotes 0 or 1.

Particularly good results are obtained with terphenyls which contain 1–14 isopropyl groups and preferably 1–6 isopropyl groups.

The alkylated polyphenyls can be prepared by conventional processes (see DRP 550 494).

The organic polynitroso compounds (d) used may be compounds of the general formula:

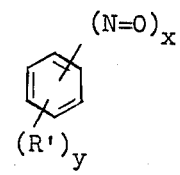

prepared by known methods (see J. Org. Chem. 25, 1071 (1960), in which formula R' denotes an alkyl-, with 1 to 10 carbon atoms, an alkoxy-, with 1 to 10 carbon atoms, an alkanolamine-, with 1 to 10 carbon atoms, a cycloalkyl-, with 5 to 12 carbon atoms, a phenyl alkyl-, with 7 to 13 carbon atoms, a phenyl-, a phenoxy-, a phenylamine-, with 6 to 12 carbon atoms, or a phenyl nitrosoamine group with 6 to 12 carbon atoms or a halogen, $y$ denotes 0 or an integer of from 1 to 5 and $x$ denotes 1 or 2. p-dinotrosobenzene is preferred.

The following are examples of suitable solvents (e): aromatic hydrocarbons such as toluene, xylene or benzene; chlorinated hydrocarbons such as methylene chloride, trichloroethylene or perchloroethylene; ketones such as acetone, methyl ethylketone or methyl isobutyl ketone; carboxylic acid esters such as methyl acetate, ethyl acetate or butyl acetate; alcohols such as methanol, ethanol or butanol; or mixtures of the above mentioned solvents. Aromatic hydrocarbons such as xylenes, toluene or benzene and/or aliphatic hydrocarbons such as trichloroethylene or perchloroethylene are preferred.

Particularly preferred combinations of components (a) to (e) are shown in Table 1.

The adhesive according to the invention preferably have the following percentage composition: 0.5 – 30 % by weight, particularly 2 – 10 % by weight, of component (a); 0.5 – 30 % by weight, particularly 2 –15 % by weight, of component (b); 0.5 – 30 % by weight, particularly 2 – 15 % by weight, of component (c); 0.1 – 24 % by weight, particularly 1 – 8 % by weight, of component (d); and 30 – 90 % by weight, particularly 60 – 85 % by weight, of component (e).

Other substances may also be added to the adhesive according to the invention to achieve special effects, e.g. natural or synthetic resins, for example phenol formaldehyde, resins belonging to the class of novolaks or resols, fillers such as silicates and/or carbon black or dyes and/or pigments.

According to one special embodiment, by which bonds with optimum strength and resistance are obtained, the adhesives according to the invention may be used in combination with primer solutions which ensure the greatest possible adherence to metal.

The primer solution used is preferably a solution of a low-molecular weight phenol formaldehyde resin (resol type) with a chlorinated olefine or diene polymer of the kind mentioned under (b) in a solvent or solvent mixture mentioned under (e), in particular a dialkyl ketone such as methyl isobutyl ketone.

The low-molecular weight phenol formaldehyde resin used (resol type) may be a resin obtained by alkaline condensation of phenol and formaldehyde used in proportions of from 1 : 0.5 to 1 : 1.5 and having a viscosity of from 1500 to 10,000 cP determined on a 60 % by weight solution in butanol at 20°C with a Brookfield LVF viscosimeter.

According to one embodiment of the invention the primer solution consists of from 5 to 40 % by weight, preferably from 5 to 15 % by weight, of phenol formaldehyde resin (resol type); from 5 to 40 % by weight, preferably from 5 to 15 % by weight, of a chlorinated olefine or diene polymer mentioned under (b), in particular chlorinated polyisoprene; and from 30 to 90 % by weight, preferably from 70 to 90 % by weight, of one of the solvents mentioned under (e), in particular methyl isobutyl ketone.

To prepare the adhesives or primers according to the invention, the individual components, used in the proportions indicated above, are together dissolved or suspended in one of the solvents or solvent mixtures mentioned above at temperatures of from 10° to 40°C, preferably at room temperature. The temperature employed may, of course, be above or below the range indicated.

Application of the adhesives according to the invention, and of the primer, to the materials which are to be bonded may be carried out by conventional methods, for example by dipping, brush-coating or spraying.

To prepare the bonds, a thin layer of the adhesive according to the invention is applied for example to the metal and vulcanisate surfaces which are to be bonded.

Before the adhesives are applied, the surfaces of metals which are to be bonded are preferably first sandblasted and degreased with trichloroethylene while the surfaces of the vulcanisates which are to be bonded are cleaned with trichloroethylene. The metals and vulcanisates coated with the adhesives according to the invention are placed together with their adhesive layers in contact after the solvent has evaporated off, and they are then heated for up to 1 hour or longer at an elevated temperature, preferably in the range of from 100° to 200°C. During the heating process, the bond is fixed by pressure to ensure intimate contact between the two adhesive layers.

The composite structures produced in this way, which are distinguished by their high strength as well as their high resistance to organic solvents, oils and fats, can be used in various fields, for example in the motor car industry for manufacturing safety elements in motor cars.

The adhesives according to the invention may be used for bonding materials such as plastics, metals, porcelain or rubber and are preferably used for bonding metals to rubber vulcanisates, such as vulcanisates of natural rubber, nitrile rubber, butyl rubber or styrene-butadiene rubber, particularly natural rubber vulcanisates.

The percentages given in the following examples are percentages by weight unless otherwise indicated.

Examples

Table 1

| Adhesive | A | B | |
|---|---|---|---|
| Ethylene/vinyl acetate copolymer(1) | 4 | | parts by weight |
| Chlorosulphonated polyethylene(2) | | 4 | parts by weight |
| Chlorinated polyisoprene(3) | 8 | 8 | parts by weight |
| Isopropylated terphenyl(4) containing about 3 isopropyl groups | 8 | 8 | parts by weight |
| Carbon black(6) | 2 | 2 | parts by weight |
| p-dinitrosobenzene | 4 | 4 | parts by weight |
| Xylene | 55 | 55 | parts by weight |
| Perchloroethylene | 15 | 15 | parts by weight |

(1)with a vinyl acetate content of 45 % and a melt index of from 2 to 5, determined according to ASTM D 1238, condition E.
(2)with a chlorine content of 42 % and a sulphur content of 1.1 %
(3)with a chlorine content of 67 % and a viscosity of 160 cP determined as a 20 % solution in toluene at 20°C using a Brookfield LVF viscosimeter (spindle 1, 30 revs. per min.)
(4)with a viscosity of 6000 Poises determined at 20°C with Brookfield RVT viscosimeter (spindle 7, 5 revs. per min.)
(6) MT carbon black (thermal carbon black).

These adhesives were used for producing bonds between steel (free cutting steel 9 S 20 K) and various rubber materials. The composition of the rubbers and conditions of vulcanisation are shown in Table 2.

Table 2:

Vulcanisate I 100.0 parts by weight of natural rubber;

20.0 parts by weight of zinc oxide;
2.0 parts by weight of stearic acid;
1.2 parts by weight of phenyl-β-naphthylamine;
30.0 parts by weight of ISAF carbon black (furnace black);
1.0 parts by weight of 2-mercapto benzothiazole;
3.5 parts by weight of sulphur;
vulcanisation: 35 minutes at 140°C Vulcanisate II 100.0 parts by weight of nitrile rubber (butadiene/acrylonitrile copolymer containing 33 % of acrylonitrile);
7.5 parts by weight of zinc oxide;
0.5 parts by weight of stearic acid;
40.0 parts by weight of SRF carbon black (furnace black);
1.0 parts by weight of colophony;
2.0 parts by weight of methylene-bis-thioglycolic acid butyl ester;
5.0 parts by weight of cumarone resin;
0.8 parts by weight of benzothiazyl-2-diethyl sulphenamide;
1.7 parts by weight of sulphur;
vulcanisation: 35 minutes at 140°C Vulcanisate III 100.0 parts by weight of styrene-butadiene rubber (styrene/butadiene copolymer containing 23.5 % of styrene);
5.0 parts by weight of zinc oxide;
1.0 parts by weight of stearic acid;
60.0 parts by weight of HAF carbon black (furnace black);
15.0 parts by weight of aromatic mineral oil plasticiser;
1.5 parts by weight of phenyl-β-naphthylamine;
1.4 parts by weight of benzothiazyl-2-cyclohexyl sulphenamide;
0.1 parts by weight of tetramethyl thiuramic monosulphide;
1.8 parts by weight of sulphur;
vulcanisation: 20 minutes at 150°C.

Test samples were prepared in accordance with method B of ASTM D 429-68. Metal strips which has been sand-blasted and degreased with trichloroethylene and strips of the given vulcanisates which had been cleaned with trichloroethylene were coated with a thin layer of the adhesives shown in Table 1. After 3 hours drying at room temperature, the coated metal strips and coated vulcanisate strips were placed together with the layers of adhesive in contact, and were then heated to 140°C under light pressure for 40 minutes. After the test samples had been stored at room temperature for 24 hours, the strength of the rubber-to-metal bonds was determined by the peeling test according to ASTM test method D 429-68, method B, at room temperature and at elevated temperatures. The results obtained are summarised in Table 3.

The strengths of the bonds obtained when using a primer X of the following composition are also shown in Table 3:

| | |
|---|---|
| Chlorinated polyisoprene[1] | 10 parts by weight |
| Phenol formaldehyde resin[2] | 8 parts by weight |
| Carbon black[3] | 2 parts by weight |
| Methyl isobutyl ketone | 80 parts by weight |

[1]with a chlorine content of 67 % and a viscosity of 160 cP (20 % solution in toluene) determined at 20°C with a Brookfield LVF viscosimeter (spindle 1, 30 revs. per min.)
[2]unmodified, hardenable phenol formaldehyde condensation product (resol type) with a molar ratio of phenol to formaldehyde of 1:1.14, 60 % solution in butanol with a viscosity of 3200 cP determined at 20°C with a Brookfield LVF viscosimeter (spindle 3, 30 revs. per min.)
[3]MT carbon black (thermal carbon black).

Primer X was applied as a thin layer to the sand-blasted and degreased metal strips. After a drying time of 30 minutes, the adhesive shown in Table 1 was applied to the metal strips and to the rubber vulcanisates which had been coated with primer. After a further 3 hours, the test samples were prepared in accordance with method B, ASTM D 429-68, as already described above.

Adhesives of the following composition, which had been prepared according to German Auslegeschrift No. 1 295 123, were used for comparison Examples 13 and 14:

Adhesive C

| | |
|---|---|
| Ethylene/vinyl acetate copolymer[1] | 11 parts by weight |
| Maleate resin[2] | 2 parts by weight |
| Terpene-phenol resin[3] | 2 parts by weight |
| Methylene chloride | 35 parts by weight |
| Toluene | 35 parts by weight |
| Petroleum hydrocarbons $Bp_{760}$:60–90°C | 15 parts by weight |

[1]with a vinyl acetate content of 45 % and a melt index of from 2 to 5 determined according to ASTM D 1238, condition E
[2]with an acid number according to DIN 53 183 of 16 and a melting point according to DIN 53 181 of 130°C
[3]with an acid number according to DIN 53 183 of 65 and a melting point according to DIN 53 181 of 140°C.

Table 3

| Example | Vulcanisate | Adhesive | Primer | Bonding strength (kp/cm) | | | |
|---|---|---|---|---|---|---|---|
| | | | | 20°C | 80°C | 100°C | 120°C |
| 1 | I | A | — | 17.2*) | 5.7 | 3.2 | 1.6 |
| 2 | I | A | × | 21.2*) | 8.4 | 5.6 | 2.8 |
| 3 | II | A | — | 18.6*) | | | |
| 4 | II | A | × | 23.3*) | | | |
| 5 | III | A | — | 14.2*) | | | |
| 6 | III | A | × | 18.6*) | | | |
| 7 | I | B | — | 15.7*) | 5.8 | 2.8 | 1.3 |
| 8 | I | B | × | 19.8*) | 9.6 | 5.2 | 2.1 |
| 9 | II | B | — | 17.4*) | | | |
| 10 | II | B | × | 22.1*) | | | |
| 11 | III | B | — | 16.3*) | | | |
| 12 | III | B | × | 20.2*) | | | |
| 13 | I | C | — | 1.5 | | | |
| 14 | I | C | × | 2.5 | | | |

*)vulcanisate torn out

We claim:
1. An adhesive composition consisting substantially of a. 0.5–30% by weight of a copolymer of ethylene and a vinyl ester having from 2 to 10 carbon atoms in the ester moiety, said vinyl ester being present in an amount of 35–70% by weight, based on the weight of said copolymer;
b. 0.5–30% by weight of a member selected from the group consisting of chlorinated polyisoprene, chlorinated polyethylene, chlorinated polypropylene and chlorinated natural rubber, each of said members having a chlorine content of 60–70% by weight;
c. 0.5–30% by weight of a compound of the formula

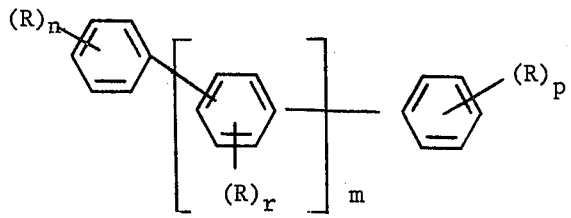

wherein each R is separately alkyl having 1 to 10 carbon atoms, alkoxy having 1 to 10 carbon atoms, cycloalkyl having 5 to 12 carbon atoms, phenyl, phenylalkyl having 7 to 13 carbon atoms, alkylphenyl having 7 to 13 carbon atoms, phenoxy or phenalkoxy having 7 to 12 carbon atoms; $n$ is zero or an integer of from 1 to 5; $p$ is an integer of from 1 to 2; $r$ is zero or an integer of from 1 to 4 and $m$ is zero or an integer of from 1 to 3;
d. 0.1–24% by weight of a compound of the formula

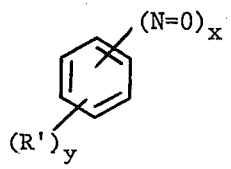

wherein R' is alkyl having 1 to 10 carbon atoms, alkanolamino having 1 to 10 carbon atoms, cycloalkyl having 5 to 12 carbon atoms, phenylalkyl having 7 to 13 carbon atoms, phenyl, phenoxy, phenylamino having 6 to 12 carbon atoms, phenylnitrosoamino having 6 to 12 carbon atoms or halogen; $y$ is zero or an integer of from 1 to 5 and $x$ is 2 and
e. 30–90% by weight of at least one organic solvent.

2. The adhesive composition of claim 1, wherein (c) is a terphenylene and R is isopropyl.

3. The adhesive composition of claim 1 wherein (c) is a terphenylene and R is phenethyl.

4. The adhesive composition of claim 1 wherein (d) is dinitrosobenzene.

5. The adhesive composition of claim 1 wherein (e) is at least one solvent selected from the group consisting of aromatic hydrocarbons, chlorinated hydrocarbons, ketones, carboxylic acid esters and alcohols.

6. The adhesive composition of claim 1 wherein (e) is xylene, toluene, benzene, trichloroethylene or perchloroethylene.

* * * * *